(12) United States Patent
Ashworth et al.

(10) Patent No.: US 11,394,453 B2
(45) Date of Patent: *Jul. 19, 2022

(54) MULTIPLE-INPUT MULTIPLE-OUTPUT (MIMO) REPEATER SYSTEM

(71) Applicant: Wilson Electronics, LLC, St. George, UT (US)

(72) Inventors: Christopher Ken Ashworth, Toquerville, UT (US); Patrick Lee Cook, Cedar City, UT (US); Dale Robert Anderson, Colleyville, TX (US); Ilesh V. Patel, Euless, TX (US); Glen Raggio, Mesquite, TX (US)

(73) Assignee: Wilson Electronics, LLC, St. George, UT (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/108,987

(22) Filed: Dec. 1, 2020

(65) Prior Publication Data

US 2021/0083756 A1 Mar. 18, 2021

Related U.S. Application Data

(63) Continuation of application No. 16/403,380, filed on May 3, 2019, now Pat. No. 10,855,363.
(Continued)

(51) Int. Cl.
*H04B 7/15* (2006.01)
*H04B 7/0413* (2017.01)
*H04W 16/26* (2009.01)

(52) U.S. Cl.
CPC ............. *H04B 7/15* (2013.01); *H04B 7/0413* (2013.01); *H04W 16/26* (2013.01)

(58) Field of Classification Search
CPC ........ H04B 7/0413; H04B 7/155; H04B 7/15; H04W 16/26
See application file for complete search history.

(56) References Cited

U.S. PATENT DOCUMENTS 4,776,032 A 10/1988 Odate et al.
5,303,395 A 4/1994 Dayani
(Continued)

FOREIGN PATENT DOCUMENTS

EP 1525678 B1 7/2008

OTHER PUBLICATIONS

3GPP2 C.S0011-B; "Recommended Minimum Performance Standards for cdma2000® Spread Spectrum Mobile Stations;" TIA-98-E; (Dec. 13, 2002); 448 pages; Release B, Version 1, Revision E.
(Continued)

*Primary Examiner* — Syed Ali
(74) *Attorney, Agent, or Firm* — Thorpe North & Western, LLP

(57) ABSTRACT

Technology for a diversity bi-directional repeater is disclosed. The diversity bi-directional repeater can include a first interface port, a second interface port, a $1^{st}$ first-direction signal amplification and filtering path communicatively coupled between the first interface port and the second interface port, and a $1^{st}$ second direction signal amplification and filtering path communicatively coupled between the first interface port and the second interface port. The diversity bi-directional repeater can further include a third interface port, a fourth interface port, a $2^{nd}$ first-direction signal amplification and filtering path communicatively coupled between the third interface port and the fourth interface port, and a $2^{nd}$ second direction signal amplification and filtering path communicatively coupled between the third interface port and the fourth interface port.

18 Claims, 7 Drawing Sheets

Related U.S. Application Data

(60) Provisional application No. 62/668,138, filed on May 7, 2018.

(56) References Cited

U.S. PATENT DOCUMENTS

| | | | |
|---|---|---|---|
| 5,737,687 A | 4/1998 | Martin et al. | |
| 5,777,530 A | 7/1998 | Nakatuka | |
| 5,835,848 A | 11/1998 | Bi et al. | |
| 6,005,884 A | 12/1999 | Cook et al. | |
| 6,125,109 A | 9/2000 | Fuerter | |
| 6,711,388 B1 | 3/2004 | Neitiniemi | |
| 6,718,160 B2 | 4/2004 | Schmutz | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,974,573 B2 | 7/2011 | Dean | |
| 8,790,241 B2 | 7/2014 | Edwin et al. | |
| 8,818,263 B1 | 8/2014 | Ashworth et al. | |
| 8,867,572 B1 | 10/2014 | Zhan | |
| 9,608,758 B1* | 3/2017 | Zhao | H04J 14/0282 |
| 2002/0044594 A1 | 4/2002 | Bongfeldt | |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0084379 A1 | 4/2006 | O'Neill | |
| 2007/0071128 A1 | 3/2007 | Meir et al. | |
| 2007/0188235 A1 | 8/2007 | Dean | |
| 2007/0218951 A1 | 9/2007 | Risheq et al. | |
| 2007/0249402 A1 | 10/2007 | Dong et al. | |
| 2008/0081555 A1 | 4/2008 | Kong et al. | |
| 2008/0096483 A1 | 4/2008 | Van Buren et al. | |
| 2008/0278237 A1 | 11/2008 | Blin | |
| 2008/0299896 A1 | 12/2008 | Mohebbi | |
| 2009/0196215 A1 | 8/2009 | Sabat et al. | |
| 2010/0056215 A1 | 3/2010 | Gorokhov et al. | |
| 2010/0142416 A1 | 6/2010 | Kim | |
| 2010/0197222 A1* | 8/2010 | Scheucher | H01Q 9/30 455/11.1 |
| 2011/0085477 A1 | 4/2011 | Schiff | |
| 2011/0151775 A1 | 6/2011 | Kang et al. | |
| 2011/0255620 A1 | 10/2011 | Jones, IV et al. | |
| 2013/0077502 A1 | 3/2013 | Gainey et al. | |
| 2013/0191872 A1* | 7/2013 | Lee | H04N 21/43635 725/78 |
| 2013/0203404 A1* | 8/2013 | Cook | H03F 1/26 455/423 |
| 2014/0011442 A1 | 1/2014 | Dussmann | |
| 2014/0055302 A1 | 2/2014 | Jia | |
| 2014/0071838 A1 | 3/2014 | Jia et al. | |
| 2014/0254389 A1 | 9/2014 | Van Nee et al. | |
| 2015/0009892 A1 | 1/2015 | Chang et al. | |
| 2015/0079898 A1 | 3/2015 | Pergal | |
| 2016/0036574 A1* | 2/2016 | Rose | H04B 7/2606 370/329 |
| 2016/0226712 A1* | 8/2016 | Palmer | H04L 41/12 |
| 2016/0285481 A1 | 9/2016 | Cohen | |
| 2016/0344519 A1 | 11/2016 | Lin et al. | |
| 2018/0070323 A1 | 3/2018 | Zhan | |
| 2018/0212706 A1* | 7/2018 | Ghuman | H04J 14/0204 |
| 2018/0351605 A1 | 12/2018 | Liang et al. | |
| 2018/0368142 A1 | 12/2018 | Lion. | |
| 2019/0037286 A1* | 1/2019 | Ghuman | H04Q 11/00 |
| 2019/0082426 A1 | 3/2019 | Lion et al. | |
| 2019/0090227 A1 | 3/2019 | Tsai et al. | |
| 2019/0123805 A1* | 4/2019 | Zhan | H04Q 1/08 |
| 2020/0350943 A1* | 11/2020 | Zhan | H04B 7/15507 |
| 2021/0209052 A1* | 7/2021 | Chen | G06F 15/177 |

OTHER PUBLICATIONS

ADL5513; "1 MHz to 4 GHz, 80 dB Logarithmic Detector / Controller;" Data Sheet; (2008); 25 pages.

European Search Report Application No. 19173174.4 dated Sep. 30, 2019, 9 Pages.

Flömer; "MIMO Off-Air Repeaters;" Cobham Wireless—Coverage; (Jul. 2013); 3 pages; White Paper.

Fujitsu Network Communications Inc.; "Enhancing RF Capacity Via Over-the-Air Repeaters;" (2012); 18 pages.

HMC713LP3E; "54 dB, Logarithmic Detector / Controller, 50-8000 MHz;" Data Sheet; (2010); 12 pages.

HMC909LP4E; "RMS Power Detector Single-Ended, DC—5.8 GHz;" Data Sheet; (2010); 21 pages.

PIC16F873; 28/40-Pin 8-Bit CMOS FLASH Microcontrollers; Data Sheet; (2001); 218 pages.

* cited by examiner

MULTIPLE-INPUT MULTIPLE-OUTPUT (MIMO) REPEATER SYSTEM

RELATED APPLICATIONS

This application is a continuation of U.S. patent application Ser. No. 16/403,380 filed May 3, 2019 which claims the benefit of U.S. Provisional Patent Application No. 62/668,138 filed May 7, 2018, the entire specification of which is hereby incorporated by reference in its entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
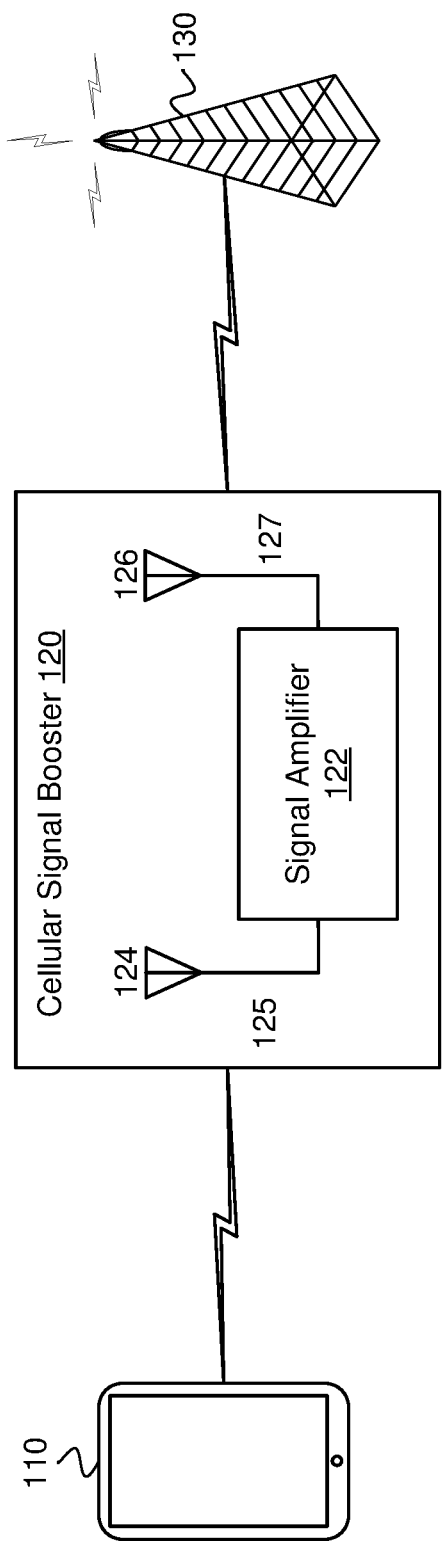
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include a server antenna 124 (e.g., an inside antenna or a coupling antenna) and a donor antenna 126 (e.g., an outside antenna). The donor antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the server antenna 124 via a first coaxial cable 125 or other type of radio frequency connection operable to communicate radio frequency signals. The server antenna 124 can wirelessly communicate the downlink signal that has been amplified and filtered to the wireless device 110.

Similarly, the server antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the donor antenna 126 via the second coaxial cable 127 or other type of radio frequency connection operable to communicate radio frequency signals. The server antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the server antenna 124 and the donor antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP).

The signal booster 120 can boost signals from the Third Generation Partnership Project (3GPP) Technical Specification (TS) 36.101 (Release 16 January 2019) bands or LTE frequency bands. In addition, the signal booster 120 can boost selected frequency bands based on the country or region in which the repeater is used, including any of bands 1-85 or other bands, as disclosed in 3GPP TS 36.104 V16.0.0 (January 2019).

In another configuration, the signal booster 120 can boost signals from the 3GPP Technical Specification (TS) 38.104 (Release 15 January 2019) bands or 5G frequency bands. In addition, the repeater 220 can boost selected frequency bands based on the country or region in which the repeater is used, including any of bands n1-n86, n257-n261, or other bands, as disclosed in 3GPP TS 38.104 V15.4.0 (January 2019).

The number of LTE frequency bands and the level of signal improvement can vary based on a particular wireless user device, cellular node, or location. Additional domestic and international frequencies can also be included to offer increased functionality. Selected models of the repeater 30 or signal booster can be configured to operate with selected frequency bands based on the location of use. In another example, the repeater 30 or signal booster can automatically sense from the wireless user devices 78 and 80 or base station (or GPS, etc.) which frequencies are used, which can be a benefit for international travelers.

In one example, the server antenna 124 and the donor antenna 126 can be comprised of a single antenna, an antenna array, or have a telescoping form-factor. In another example, the server antenna 124 and the donor antenna 126 can be a microchip antenna. An example of a microchip antenna is AMMAL001. In yet another example, the server antenna 124 and the donor antenna 126 can be a printed circuit board (PCB) antenna. An example of a PCB antenna is TE 2118310-1.

In one example, the server antenna 124 can receive uplink (UL) signals from the wireless device 110 and transmit DL signals to the wireless device 110 using a single antenna. Alternatively, the server antenna 124 can receive UL signals from the wireless device 110 using a dedicated UL antenna, and the server antenna 124 can transmit DL signals to the wireless device 110 using a dedicated DL antenna.

In one example, the server antenna 124 can communicate with the wireless device 110 using near field communication. Alternatively, the server antenna 124 can communicate with the wireless device 110 using far field communication.

In one example, the donor antenna 126 can receive downlink (DL) signals from the base station 130 and transmit uplink (UL) signals to the base station 130 via a single antenna. Alternatively, the donor antenna 126 can receive DL signals from the base station 130 using a dedicated DL antenna, and the donor antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the donor antenna 126 can communicate over Very High Frequency (VHF) communications directly with donor antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with signal boosters. This configuration can also allow users to send text messages, initiate phone calls, and engage in video communications between wireless devices with signal boosters. In one example, the donor antenna 126 can be configured to couple to the wireless device 110. In other words, communications between the donor antenna 126 and the wireless device 110 can bypass the integrated booster.

In another example, a separate VHF node antenna can be configured to communicate over VHF communications directly with separate VHF node antennas of other signal boosters. This configuration can allow the donor antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the donor antenna 126 can be configured to act as a satellite communication antenna. In another example, a separate node antenna can be used for satellite communications. The signal booster 120 can extend the range of coverage of the wireless device 110 configured for satellite communication. The donor antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

Figure 2:
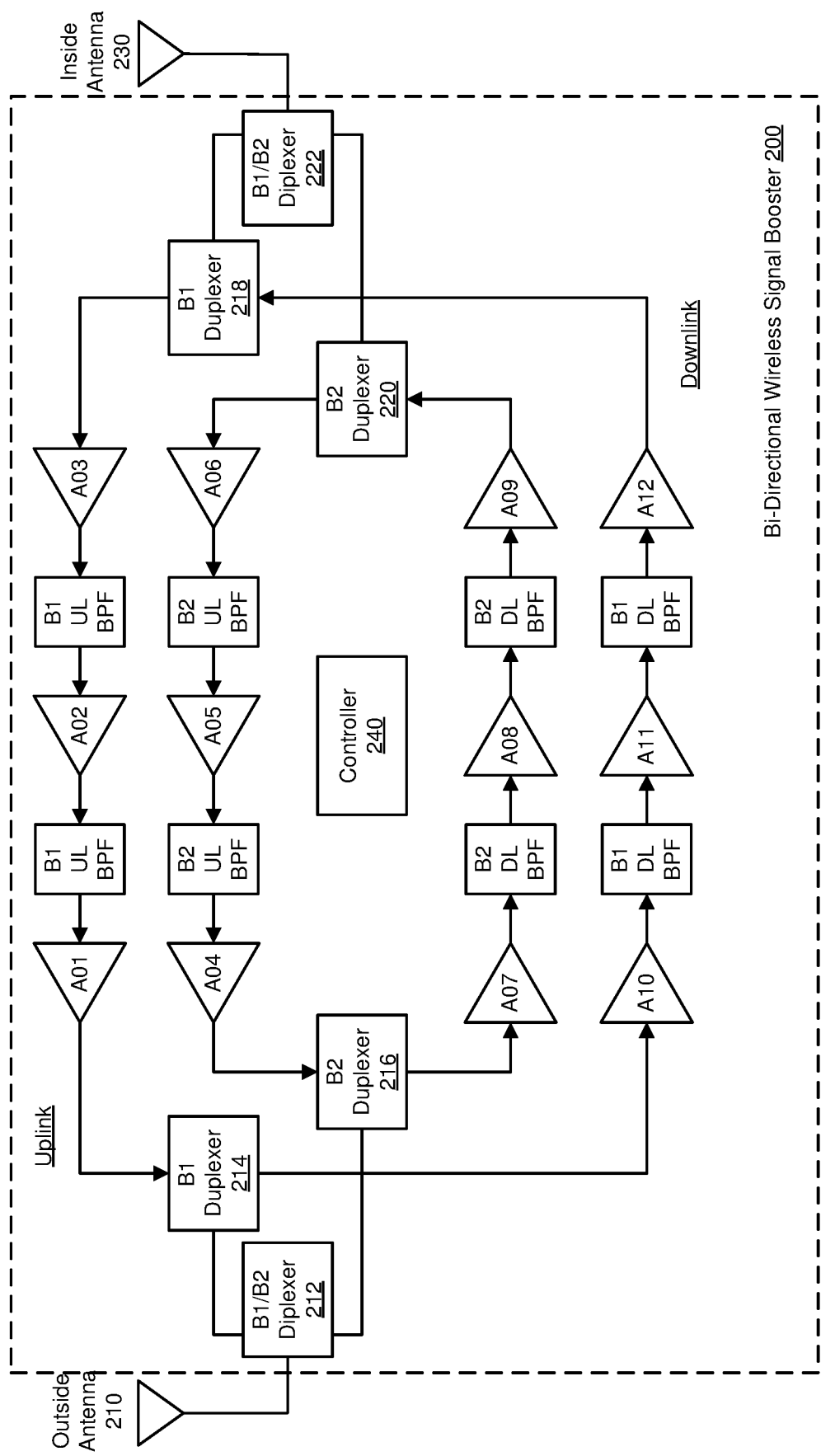
FIG. 2 illustrates a cellular signal booster configured to amplify uplink (UL) and downlink (DL) signals using one or more downlink signal paths and one or more uplink signal paths in accordance with an example.

FIG. 2 illustrates an exemplary bi-directional wireless signal booster 200 configured to amplify uplink (UL) and downlink (DL) signals using a separate signal path for each UL frequency band and DL frequency band and a controller 240. A donor antenna 210, or outside antenna, can receive a downlink signal. For example, the downlink signal can be received from a base station (not shown). The downlink signal can be provided to a first B1/B2 diplexer 212, wherein B1 represents a first frequency band and B2 represents a second frequency band. The first B1/B2 diplexer 212 can create a B1 downlink signal path and a B2 downlink signal path. Therefore, a downlink signal that is associated with B1 can travel along the B1 downlink signal path to a first B1 duplexer 214, or a downlink signal that is associated with B2 can travel along the B2 downlink signal path to a first B2 duplexer 216. After passing the first B1 duplexer 214, the downlink signal can travel through a series of amplifiers (e.g., A10, A11 and A12) and downlink band pass filters (BPF) to a second B1 duplexer 218. Alternatively, after passing the first B2 duplexer 216, the downlink can travel through a series of amplifiers (e.g., A07, A08 and A09) and downlink band pass filters (BFF) to a second B2 duplexer 220. At this point, the downlink signal (B1 or B2) has been amplified and filtered in accordance with the type of amplifiers and BPFs included in the bi-directional wireless signal booster 200. The downlink signals from the second B1 duplexer 218 or the second B2 duplexer 220, respectively, can be provided to a second B1/B2 diplexer 222. The second B1/B2 diplexer 222 can provide an amplified downlink signal to a server antenna 230. In one example, the server antenna can be a coupling antenna. The server antenna 230 can communicate the amplified downlink signal to a wireless device (not shown), such as a mobile phone.

In one example, the server antenna 230 can receive an uplink (UL) signal from the wireless device. The uplink signal can be provided to the second B1/B2 diplexer 222. The second B1/B2 diplexer 222 can create a B1 uplink signal path and a B2 uplink signal path. Therefore, an uplink signal that is associated with B1 can travel along the B1 uplink signal path to the second B1 duplexer 218, or an uplink signal that is associated with B2 can travel along the B2 uplink signal path to the second B2 duplexer 220. After passing the second B1 duplexer 218, the uplink signal can travel through a series of amplifiers (e.g., A01, A02 and A03) and uplink band pass filters (BPF) to the first B1 duplexer 214. Alternatively, after passing the second B2 duplexer 220, the uplink signal can travel through a series of amplifiers (e.g., A04, A05 and A06) and uplink band pass filters (BPF) to the first B2 duplexer 216. At this point, the uplink signal (B1 or B2) has been amplified and filtered in accordance with the type of amplifiers and BFFs included in the bi-directional wireless signal booster 200. The uplink signals from the first B1 duplexer 214 or the first B2 duplexer 216, respectively, can be provided to the first B1/B2 diplexer 212. The first B1/B2 diplexer 212 can provide an amplified uplink signal to the donor antenna 210, also referred to as an outside antenna. The donor antenna can communicate the amplified uplink signal to the base station.

In one example, the bi-directional wireless signal booster 200 can be a 6-band booster. In other words, the bi-directional wireless signal booster 200 can perform amplification and filtering for downlink and uplink signals having a frequency in bands B1, B2, B3 B4, B5 and/or B6.

In one example, the bi-directional wireless signal booster 200 can use the duplexers to separate the uplink and downlink frequency bands, which are then amplified and filtered separately. A multiple-band cellular signal booster can typically have dedicated radio frequency (RF) amplifiers (gain blocks), RF detectors, variable RF attenuators and RF filters for each uplink and downlink band.

In one configuration, a single-package, bi-directional multiple-input multiple-output (MIMO) repeater (or signal booster) system is described. MIMO signal paths can increase data rates, signal reliability (due to fading paths), and redundancy (in case one path fails). A repeater system that is installed having a MIMO configuration in parallel can improve signal diversity, bitrates and error rates. In this example, the MIMO repeater system can appear as a single repeater system, which simplifies the installation of the MIMO repeater system. The MIMO repeater system can be installed and appear as a single repeater system, but with MIMO benefits, which can increase an inverse to antenna correlation. In other words, the MIMO repeater system can be installed as a single product. The MIMO repeater system can be beneficial for Fifth Generation (5G) wireless communication systems due to the increased data rates and higher frequencies that are more dependent on a MIMO configuration. The MIMO repeater system can operate in conjunction with an LTE multi-antenna system, or alternatively, the MIMO repeater system may not operate in conjunction with a MIMO wireless communication network (e.g., a base station can use a single antenna and a mobile device can use a single antenna).

In one example, the MIMO repeater system can include a diversity repeater, donor antenna(s) and server antenna(s). The diversity repeater can include multiple diversity sub-repeaters (or repeater units) which are packaged together to form the diversity repeater. For example, two diversity sub-repeaters can be packaged together to form the diversity repeater. Thus, the diversity repeater can include separate diversity sub-repeaters that are packaged together. The separate diversity sub-repeaters can have the same functionality. Each of the diversity sub-repeaters can include multiple downlink and uplink signal paths for amplifying and filtering signals. The aggregation of signal paths for the same bands between the separate diversity sub-repeaters can provide a MIMO capability. In addition, the multiple diversity sub-repeaters can share certain resources in the diversity repeater. In other words, the diversity repeater can include common resources that are shared by the individual diversity sub-repeaters. For example, the individual diversity sub-repeaters can share a common micro controller, a common user interface, a common power supply, etc. in the diversity repeater. Therefore, even though the individual diversity sub-repeaters can be separate units that are packaged together, the individual diversity sub-repeaters can access common resources in the diversity repeater.

In one example, the individual diversity sub-repeaters can share network protection. For example, the diversity repeater can include a controller that performs network protection for all of the individual diversity sub-repeaters. The controller can perform network protection in accordance with Part 20 of the Federal Communications Commission (FCC) Consumer Booster Rules. The FCC Consumer Booster Rules necessitate that uplink signal paths and downlink signal are to work together for network protection. Network protection can be performed in order to protect a cellular network from overload or noise floor increase. The controller can perform network protection by adjusting a gain or noise power for each band in the uplink transmission paths based on control information from each band in the downlink transmission paths. The control information from each band in the downlink transmission paths can include a received signal strength indication (RSSI) associated with downlink received signals. In other words, based on the RSSI of the downlink received signals traveling on the downlink transmission paths, the controller can adjust (i.e., increase or decrease) the gain or noise power for the uplink transmission paths. By adjusting the gain or noise floor when performing the network protection, the network (e.g., base stations) can be prevented from becoming overloaded with uplink signals that exceed a defined threshold.

In one example, the diversity repeater (which contains the individual diversity sub-repeaters) can be communicatively coupled to the donor antenna(s) and the server antenna(s), respectively. The diversity repeater can communicate signals with a base station via the donor antenna(s), and the diversity repeater can communicate signals with a mobile device via the server antenna(s). The donor antennas(s) and the server antenna(s) can be different types of antennas. For example, the donor antenna(s) can be omni-directional antennas, directional antennas, lock periodic antennas, or panel antennas. As another example, the server antenna(s) can be dome antennas. In one example, the donor antennas and the server antennas can be separately packaged to allow for increased spatial isolation and spatial diversity. Generally speaking, the donor antennas and the server antennas can be separately as much as possible to prove increased diversity and isolation from each other.

As used herein, the term "coupled" typically refers to two devices that are directly electrically connected. The term "communicatively coupled" refers to two devices that are electrically connected, with additional electrical components located between the two devices. However, the terms are meant to be descriptive and are not intended to be limiting. The terms "coupled" and "communicatively coupled" may be used interchangeably.

In one example, each of the individual diversity sub-repeaters in the diversity repeater can be connected to diversity antenna(s). The diversity antenna(s) can each effectively be multiple antennas that are packaged together with different polarizations and isolation. The diversity antenna(s) can include diversity donor antennas and/or diversity server antennas. The diversity donor antennas can include diversity omni-directional antennas, diversity directional antennas, diversity lock periodic antennas, or diversity panel antennas. The diversity server antennas can include diversity dome antennas.

In a specific example, when the diversity repeater includes two individual diversity sub-repeaters, each of the two individual diversity sub-repeaters can be connected to a diversity donor antenna and a diversity server antenna. In this example, the diversity donor antenna can effectively be two donor antennas with two different polarizations and isolation between the two donor antennas, whereas the diversity server antenna can effectively be two server antennas with two different polarizations and isolation between the two server antennas. In other words, in this example, the diversity donor antenna can be two donor antennas in one package, and the diversity server antenna can be two server antennas in one package.

In one configuration, the diversity donor antenna and the diversity server antenna can include more than two donor antennas and two server antennas, respectively. For example, a diversity donor antenna or a diversity server antenna can each include three antennas, four antennas, five antennas, etc. in a single package with sufficient isolation and diversity between the antennas within the single package.

In an alternative example, the diversity donor antenna or the diversity server antenna can include multiple antennas that are in a separate package, which can provide increased spatial diversity and isolation. In this example, the multiple antennas in the diversity donor antenna or the diversity server antenna can be installed further apart rather than having the multiple antennas in the same package.

In one example, the MIMO repeater system can include a diversity repeater with more than two individual diversity sub-repeaters to achieve the MIMO capability. For example, the MIMO repeater system can include a diversity repeater with three diversity sub-repeaters, three donor antennas and three server antennas. Alternatively, the MIMO repeater system can include a diversity repeater with three diversity sub-repeaters, a diversity donor antenna with three donor antennas packaged together, and a diversity server antenna with three server antennas packaged together.

In one example, the MIMO repeater system can include a diversity repeater with N diversity sub-repeaters, a diversity donor antenna with N separate donor antennas in a single package, and a diversity server antenna with N separate server antennas in a single package to achieve the MIMO capability, wherein N is an integer. In other words, the MIMO repeater can employ the same number of diversity sub-repeaters, donor antennas, and server antennas.

In one configuration, the diversity repeater can combine separate signal paths to achieve the MIMO capability. In other words, the MIMO capability can be achieved with separate signal paths. For example, a first diversity sub-repeater in the diversity repeater can include a signal path that amplifies signals in a certain band, and a second diversity sub-repeater in the diversity repeater can include a signal path that amplifies signals in the same band as the first diversity sub-repeater, thereby achieving the MIMO capability. As an example, if the first r diversity sub-repeater operates on B5, then the second diversity sub-repeater would operate on B5 as well. Therefore, each of the individual diversity sub-repeaters in the diversity repeater can operate on the same bands to improve the MIMO capability. In other words, all of the individual diversity sub-repeaters in the diversity repeater can be configured to amplify signals on the same bands to improve the MIMO capability.

In one configuration, the individual diversity sub-repeaters in the diversity repeater can include separate delay blocks. Since MIMO benefits from delay spread, the individual diversity sub-repeaters can each implement a known delay block (e.g., 1 microsecond or 100 microseconds). As a result, one signal path in one diversity sub-repeater can have some delay in relation to another signal path in another diversity sub-repeater, which can improve the MIMO capability. The individual diversity sub-repeaters can be designed together with a known delay (relative to the other diversity sub-repeaters), such that the individual diversity sub-repeaters in the diversity repeater can work better together to achieve the MIMO capability.

In one example, the diversity repeater can implement delay functionality using a hardware delay block. Alternatively, the diversity repeater can implement delay functionality with different coaxial cable lengths or different levels of filtering in the individual diversity sub-repeaters. In yet another example, the delay functionality can be achieved digitally, as opposed to be achieved in hardware.

In one configuration, the individual diversity sub-repeaters in the diversity repeater can have different characteristics. For example, a first diversity sub-repeater in the diversity repeater can apply a different gain in relation to a second diversity sub-repeater in the diversity repeater. As another example, a first diversity sub-repeater in the diversity repeater can have a different output power (e.g., a lower or higher UL output power and/or DL output power) in relation to a second diversity sub-repeater in the diversity repeater, which could be useful when the diversity repeater is amplifying Voice over Long Term Evolution (VoLTE) signals. As yet another example, a first diversity sub-repeater in the diversity repeater can be a Fourth Generation (4G) repeater and a second diversity sub-repeater in the diversity repeater can be a 5G repeater, or vice versa.

In one configuration, a first set of coaxial cables can connect the individual diversity sub-repeaters in the diversity repeater to the diversity donor antenna, and a second set of coaxial cables can connect the individual diversity sub-repeaters in the diversity repeater to the diversity server antenna. The first set of coaxial cables can be routed in parallel as a single coaxial cable, and the second set of coaxial cables can be routed in parallel as a separate single coaxial cable. The first set of coaxial cables can be connected to a single connector (or common connector), and the second set of coaxial cables can be connected to a separate single connector (or separate common connector), thereby allowing the first and second sets of coaxial cables to be routed in parallel as single coaxial cables, respectively. For example, the first and second sets of coaxial cables can be routed in parallel as single coaxial cables, respectively, using snap-on RF connectors. One example of snap-on RF connectors include SubMiniature version B (SMB) connectors, which can function as snap-on RF connectors.

Figure 3:
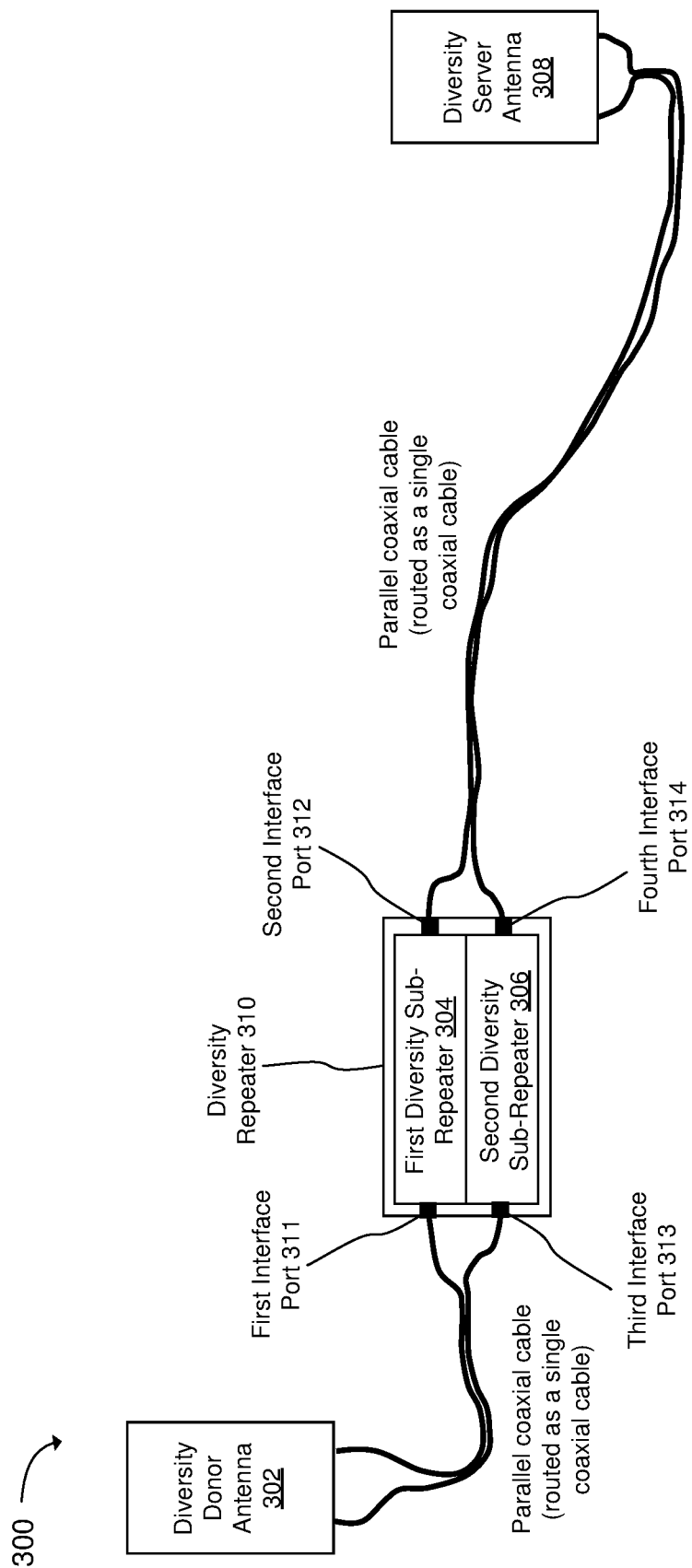
FIG. 3 illustrates a bi-directional multiple-input multiple-output (MIMO) repeater system in accordance with an example.

FIG. 3 illustrates an example of a bi-directional multiple-input multiple-output (MIMO) repeater system 300. The bi-directional MIMO repeater system 300 can include a diversity repeater 310. The diversity repeater 310 can include a first diversity sub-repeater 304 and a second diversity sub-repeater 306. The first and second diversity sub-repeaters 304, 306 can be referred to as individual repeater units. The first and second diversity sub-repeaters 304, 306 can be configured to filter and amplify signals in defined bands. The first diversity sub-repeater 304 and the second diversity sub-repeater 306 can be packaged as a single unit to form the diversity repeater 310. In an alternative configuration, the diversity repeater 310 can include more than two individual diversity sub-repeaters that are packaged together as a single unit.

In one example, the first diversity sub-repeater 304 and the second diversity sub-repeater 306 can each be connected to a diversity donor antenna 302 of the bi-directional MIMO repeater system 300. The first diversity sub-repeater 304 and the second diversity sub-repeater 306 can each be connected to the diversity donor antenna 302 via parallel coaxial cables that are routed as a single coaxial cable. The first diversity sub-repeater 304 and the second diversity sub-repeater 306 can be connected to the diversity donor antenna 302 via a first interface port 311 and a third interface port 313, respectively. Similarly, the first diversity sub-repeater 304 and the second diversity sub-repeater 306 can each be connected to a diversity server antenna 308 of the bi-directional MIMO repeater system 300. The first diversity sub-repeater 304 and the second diversity sub-repeater 306 can each be connected to the diversity server antenna 308 via parallel coaxial cables that are routed as a single coaxial cable. The first diversity sub-repeater 304 and the second diversity sub-repeater 306 can be connected to the diversity server antenna 308 via a second interface port 312 and a fourth interface port 314, respectively.

In one configuration, the bi-directional MIMO repeater system 300 with the diversity repeater 310 can provide MIMO signal paths that increase data rates, signal reliability (due to fading paths), and redundancy (in case one path fails). The bi-directional MIMO repeater system 300 can appear as a single repeater system, which simplifies the installation of the bi-directional MIMO repeater system 300. The bi-directional MIMO repeater system 300 can be beneficial for Fifth Generation (5G) wireless communication systems due to the increased data rates and higher frequencies that are more dependent on a MIMO configuration. In one example, the bi-directional MIMO repeater system 300 can include the diversity repeater 310 with multiple diversity sub-repeaters that are packaged together, such as the first diversity sub-repeater 304 and the second diversity sub-repeater 306. The first diversity sub-repeater 304 and the second diversity sub-repeater 306 can have the same functionality. The aggregation of signal paths for the same bands between the first diversity sub-repeater 304 and the second diversity sub-repeater 306 can improve the MIMO capability in terms of signal diversity, bitrate and/or error rate.

In one configuration, the diversity repeater 310 can combine separate signal paths to achieve the MIMO capability. In other words, the MIMO capability can be achieved with separate signal paths. For example, the first diversity sub-repeater 304 in the diversity repeater 310 can include a signal path that amplifies signals in a certain band, and the second diversity sub-repeater 306 in the diversity repeater 310 can include a signal path that amplifies signals in the same band as the first diversity sub-repeater 304, thereby achieving the MIMO capability. Therefore, the first diversity sub-repeater 304 and the second diversity sub-repeater 306 can each operate on the same bands to achieve the MIMO capability.

In one example, the first diversity sub-repeater 304 and the second diversity sub-repeater 306 can share certain resources in the diversity repeater 310. In other words, the diversity repeater 310 can include common resources that are shared between the first diversity sub-repeater 304 and the second diversity sub-repeater 306. For example, the first diversity sub-repeater 304 and the second diversity sub-repeater 306 can share a common micro controller, a common user interface, a common power supply, etc. in the diversity repeater 310. The first diversity sub-repeater 304 and the second diversity sub-repeater 306 can share network protection. Therefore, even though the first diversity sub-repeater 304 and the second diversity sub-repeater 306 can be separate repeater units that are packaged together, the first diversity sub-repeater 304 and the second diversity sub-repeater 306 can access common resources in the diversity repeater 310.

In one example, the diversity donor antenna 302 and the diversity server antenna 308 in the bi-directional MIMO repeater system 300 provide increased spatial isolation and spatial diversity. The diversity donor antenna 302 can effectively be two donor antennas with two different polarizations and isolation between the two donor antennas. The diversity donor antenna 302 can be two donor antennas in one package. A first donor antenna in the diversity donor antenna 302 can be communicatively coupled to the first diversity sub-repeater 304, and a second donor antenna in the diversity donor antenna 302 can be communicatively coupled to the second diversity sub-repeater 306. Similarly, the diversity server antenna 308 can effectively be two server antennas with two different polarizations and isolation between the two server antennas. The diversity server antenna 308 can be two server antennas in one package. A first server antenna in the diversity server antenna 308 can be communicatively coupled to the first diversity sub-repeater 304, and a second server antenna in the diversity server antenna 308 can be communicatively coupled to the second diversity sub-repeater 306.

In one example, the diversity donor antenna 302 can include diversity omni-directional antennas, diversity directional antennas, diversity log periodic antennas, or diversity panel antennas. In another example, the diversity server antenna 308 can include diversity dome antennas.

In one configuration, the diversity donor antenna 302 can include an omni-directional antenna and a directional antenna. The omni-directional antenna can be configured to be coupled to the first diversity sub-repeater 304 via the first interface port 311. The directional antenna can be configured to be coupled to the second diversity sub-repeater 306 via the third interface port 313. The first diversity sub-repeater 304 can be configured to amplify and filter signals communicated from base stations within the range of the omni-directional antenna in the diversity donor antenna 302. The second diversity sub-repeater 306 can be configured to amplify and filter signals communicated from base stations within the range of the directional antenna. The range of the directional antenna is based on the direction in which the antenna is positioned. By using one omni-directional antenna, and one directional antenna, the range of the repeater system 300 can be extended. Alternatively, two or more directional antennas can be used in the diversity donor antenna 302, with each of the directional antennas directed in different directions to enable communication with different base stations.

In another configuration, the first diversity sub-repeater 304 and the second diversity sub-repeater 306 in the diversity repeater 310 can include separate delay blocks. Since MIMO benefits from delay spread, the first diversity sub-repeater 304 and the second diversity sub-repeater 306 can each implement a known delay block (e.g., 1 microsecond or 100 microseconds). As a result, one signal path in the first diversity sub-repeater 304 can have some delay in relation to another signal path in the second diversity sub-repeater 306, which can improve the MIMO capability. The first diversity sub-repeater 304 and the second diversity sub-repeater 306 can be designed together with a known delay (relative to each other), such that the first diversity sub-repeater 304 and the second diversity sub-repeater 306 in the diversity repeater 310 can work better together to achieve the MIMO capability.

In one configuration, the first diversity sub-repeater 304 and the second diversity sub-repeater 306 in the diversity repeater 310 can have different characteristics. For example, the first diversity sub-repeater 304 can apply a different gain in relation to the second diversity sub-repeater 306. As another example, the first diversity sub-repeater 304 can have a different output power (e.g., a lower or higher UL output power and/or DL output power) in relation to the second diversity sub-repeater 306, which could be useful when the diversity repeater 310 is amplifying Voice over Long Term Evolution (VoLTE) signals. The first diversity sub-repeater 304 can produce a gain, an output power and/or an automatic gain control (AGC) differential that is different from that produced by the second diversity sub-repeater 306. As yet another example, the first diversity sub-repeater 304 can be a Fourth Generation (4G) repeater and the second diversity sub-repeater 306 can be a 5G repeater, or vice versa.

In one configuration, the first diversity sub-repeater 304 and the second diversity sub-repeater 306 in the diversity repeater 310 can each include one or more amplification and filtering signal paths for amplifying and filtering signals. For example, the first diversity sub-repeater 304 and the second diversity sub-repeater 306 can include multiple uplink and downlink paths for amplifying and filtering signals. In one example, the multiple uplink and downlink paths can use single-input single-output (SISO) analog filters and/or dual-input single-output (DISO) analog filters for filtering signals in one or more bands.

In one configuration, the first diversity sub-repeater 304 and the second diversity sub-repeater 306 can each include a delay block to add a defined signal delay, thereby improving the MIMO capability. For example, the first diversity sub-repeater 304 can apply a first signal delay using a first delay block and the second diversity sub-repeater 306 can apply a second signal delay using a second delay block, where the second delay signal is different than the first signal delay, thereby improving the MIMO capability. In another example, the first diversity sub-repeater 304 can include a delay block, whereas the second diversity sub-repeater 306 does not include a delay block, thereby improving the MIMO capability.

In one configuration, the first diversity sub-repeater 304 can filter signals on a same set of bands as the second diversity sub-repeater 306 to achieve the MIMO capability. In one example, the first diversity sub-repeater 304 can share a network protection with the second diversity sub-repeater 306. In one example, the first diversity sub-repeater 304 can produce a higher output power in relation to an output power produced by the second diversity sub-repeater 306, or vice versa. In one example, the diversity repeater 310 provides access to one or more of a common microcontroller, a common user interface and/or a common power supply for the first diversity sub-repeater 304 and the second diversity sub-repeater 306. In one example, the diversity repeater 310 can be communicatively coupled to the diversity donor antenna 302 and the diversity server antenna 308 via a first parallel coaxial cable and a second parallel coaxial cable, respectively. The first parallel coaxial cable can be coupled to the first interface port 311 of the first diversity sub-repeater 304 and the third interface port 313 of the second diversity sub-repeater 306, and the second parallel coaxial cable can be coupled to the third interface port 312 of the first diversity sub-repeater 304 and the fourth interface port 314 of the second diversity sub-repeater 306.

In one example, the diversity repeater 310 can include a first common connector that enables the first interface port 311 and the third interface port 313 to be communicatively coupled to the diversity donor antenna 302. In addition, the diversity repeater 310 can include a second common connector that enables the second interface port 312 and the fourth interface port 314 to be communicatively coupled to the diversity server antenna 308.

In one configuration, the-directional MIMO repeater system 300 can utilize multiple diversity server antennas and/or multiple diversity donor antennas. The diversity repeater 310 can include a splitter or a tap that enables the first diversity sub-repeater 304 and the second diversity sub-repeater 306 to be communicatively coupled to the multiple diversity server antennas and/or multiple diversity donor antennas.

Figure 4:
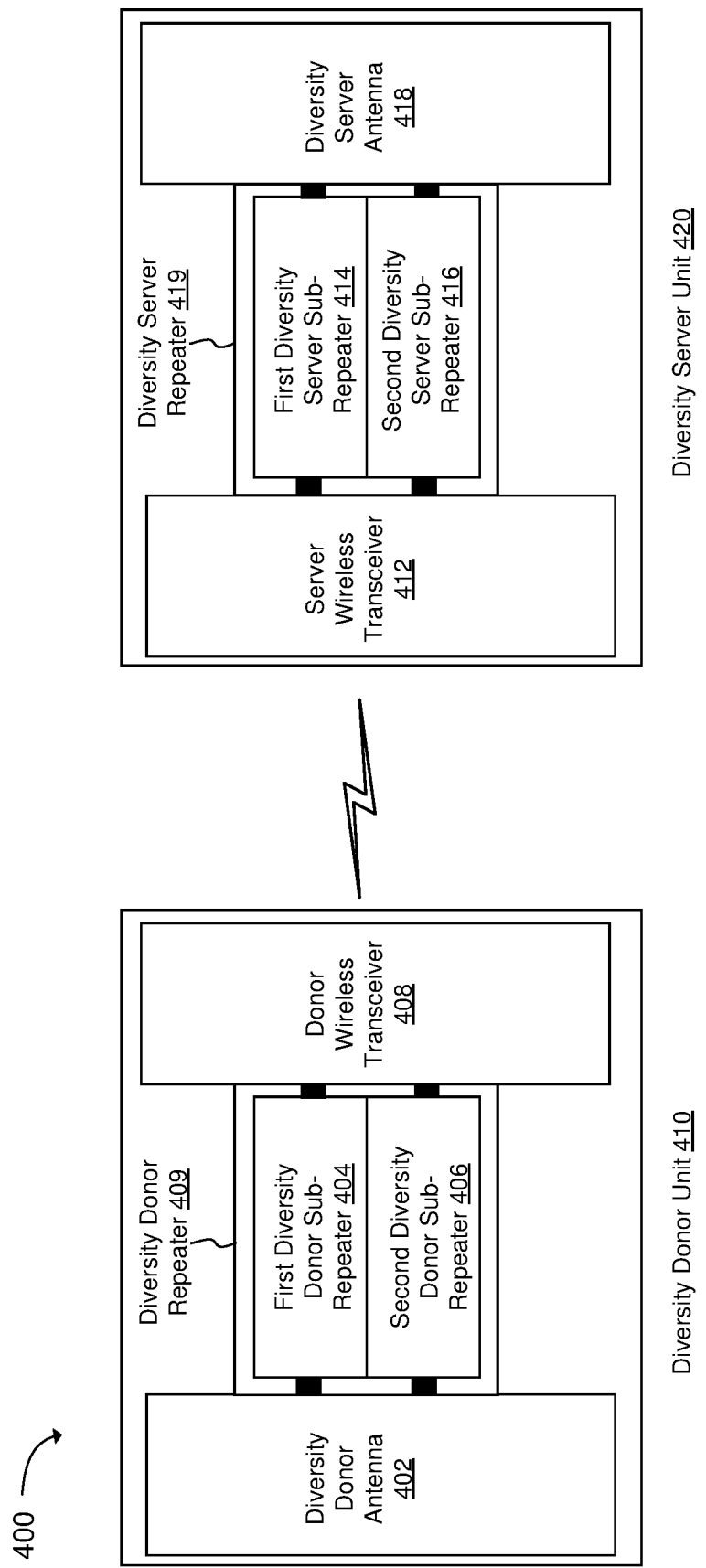
FIG. 4 illustrates a wireless multiple-input multiple-output (MIMO) repeater system in accordance with an example.

FIG. 4 illustrates an example of a wireless multiple-input multiple-output (MIMO) repeater system 400. The wireless MIMO repeater system 400 can include a diversity donor unit 410 that is in communication with a diversity server unit 420. The diversity donor unit 410 can include a diversity donor antenna 402. The diversity donor antenna 402 can communicate signals with a base station (not shown). The diversity donor unit 410 can include a diversity donor repeater 409 with multiple diversity donor sub-repeaters, such as a first diversity donor sub-repeater 404 and a second diversity donor sub-repeater 406. The first diversity donor sub-repeater 404 and the second diversity donor sub-repeater 406 can include one or more amplification and filtering paths (e.g., downlink and uplink paths) for amplifying and filtering signals in defined bands. The diversity donor unit 410 can include a donor wireless transceiver 408. The donor wireless transceiver 408 can communicate with a server wireless transceiver 412 of the diversity server unit 420.

Similarly, the diversity server unit 420 can include the server wireless transceiver 412. The server wireless transceiver 412 can communicate with the donor wireless transceiver 408 of the diversity donor unit 410. The diversity server unit 420 can include a diversity server repeater 419 with multiple diversity server sub-repeaters, such as a first diversity server sub-repeater 414 and a second diversity server sub-repeater 416. The first diversity server sub-repeater 414 and the second diversity server sub-repeater 416 can include one or more amplification and filtering paths (e.g., downlink and uplink paths) for amplifying and filtering signals in defined bands. The diversity server unit 420 can include a diversity server antenna 418. The diversity server antenna 418 can communicate signals with a mobile device (not shown).

In one configuration, the diversity donor antenna 402 in the diversity donor unit 410 can receive a downlink signal from the base station. The downlink signal can be filtered and amplified using signal paths on both the first diversity donor sub-repeater 404 and the second diversity donor sub-repeater 406 of the diversity donor repeater 409. The downlink signal, which has been filtered and amplified, can be provided to the donor wireless transceiver 408, which can transmit the downlink signal. The downlink signal can be transmitted from the donor wireless transceiver 408 as a digital signal over an industrial, scientific, and medical (ISM) radio band. For example, the downlink signal can be transmitted wirelessly over the 5.8 GHz band from the diversity donor unit 410 to the diversity server unit 420. In one example, the downlink signal can be digitized but not demodulated. The downlink signal can be received at the server wireless transceiver 412 in the diversity server unit 420. The downlink signal can be filtered and amplified using signal paths on both the first diversity server sub-repeater 414 and the second diversity server sub-repeater 416 of the diversity server repeater 419. The downlink signal, which has been filtered and amplified, can be provided to the diversity server antenna 418. The diversity server antenna 418 can transmit the downlink signal to the mobile device.

In one configuration, the diversity server antenna 418 in the diversity server unit 420 can receive an uplink signal from the mobile device. The uplink signal can be filtered and amplified using signal paths on both the first diversity server sub-repeater 414 and the second diversity server sub-repeater 416 of the diversity server repeater 419. The uplink signal, which has been filtered and amplified, can be provided to the server wireless transceiver 412, which can transmit the uplink signal. For example, the uplink signal can be transmitted as a digital signal over the ISM radio band. The uplink signal can be received at the donor wireless transceiver 408 in the diversity donor unit 410. The uplink signal can be filtered and amplified using signal paths on both the first diversity donor sub-repeater 404 and the second diversity donor sub-repeater 406 of the diversity donor repeater 409. The uplink signal, which has been filtered and amplified, can be provided to the diversity donor antenna 402. The diversity donor antenna 402 can transmit the uplink signal to the base station.

In one configuration, the diversity donor unit 410 can include shared or common resources that are accessible to each of the multiple diversity donor sub-repeaters, such as the first diversity donor sub-repeater 404 and the second diversity donor sub-repeater 406. For example, the diversity donor unit 410 can include a common microcontroller, a common application-specific integrated circuit (ASIC), a common user interface, a common power supply, a common Wi-Fi transmitter, etc. that are accessible to both the first diversity donor sub-repeater 404 and the second diversity donor sub-repeater 406. Similarly, the diversity server unit 420 can include shared or common resources that are accessible to each of the multiple diversity server sub-repeaters, such as the first diversity server sub-repeater 414 and the second diversity server sub-repeater 416. For example, the diversity server unit 420 can include a common microcontroller, a common ASIC, a common user interface, a common power supply, a common Wi-Fi transmitter, a common wireless antenna, etc. that are accessible to both the first diversity server sub-repeater 414 and the second diversity server sub-repeater 416.

In one example, the donor wireless transceiver 408 and the server wireless transceiver 412 can each be communicatively coupled to a single antenna. In other words, the diversity donor unit 410 can be communicatively coupled to a single donor antenna and the diversity server unit 420 can be communicatively coupled to a single server antenna. Data transmissions can be time duplexed between the donor antenna in the diversity donor unit 410 and the server antenna in the diversity server unit 420.

In one example, the diversity donor unit 410 can include multiple diversity donor sub-repeaters, such as the first diversity donor sub-repeater 404 and the second diversity donor sub-repeater 406, which filter and amplify signals on a same set of bands to achieve a MIMO capability for the wireless MIMO repeater system 400. Similarly, the diversity server unit 420 can include multiple diversity server sub-repeaters, such as the first diversity server sub-repeater 414 and the second diversity server sub-repeater 416, which filter and amplify signals on a same set of bands to achieve the MIMO capability for the wireless MIMO repeater system 400.

In one example, the diversity donor unit 410 can include the diversity donor antenna 402 with N separate antennas in a single antenna package, and N diversity donor sub-repeaters in the diversity donor repeater 409, where N is an integer. Similarly, the diversity server unit 420 can include the diversity server antenna 418 with N separate antennas in a single antenna package, and N diversity server sub-repeaters in the diversity server repeater 419, where N is an integer.

In one example, the first diversity donor sub-repeater 404 can include a delay block to apply a first signal delay and the second diversity donor sub-repeater 406 can include a delay block to apply a second signal delay, thereby achieving delay spread for the MIMO capability. Alternatively, the second diversity donor sub-repeater 406 may not include a delay block to cause the delay spread between the first diversity donor sub-repeater 404 and the second diversity donor sub-repeater 406. Similarly, the first diversity server sub-repeater 414 can include a delay block to apply a first signal delay and the second diversity server sub-repeater 416 can include a delay block to apply a second signal delay, thereby achieving delay spread for the MIMO capability. Alternatively, the second diversity server sub-repeater 416 may not include a delay block to cause the delay spread between the first diversity server sub-repeater 414 and the second diversity server sub-repeater 416.

Figure 5:
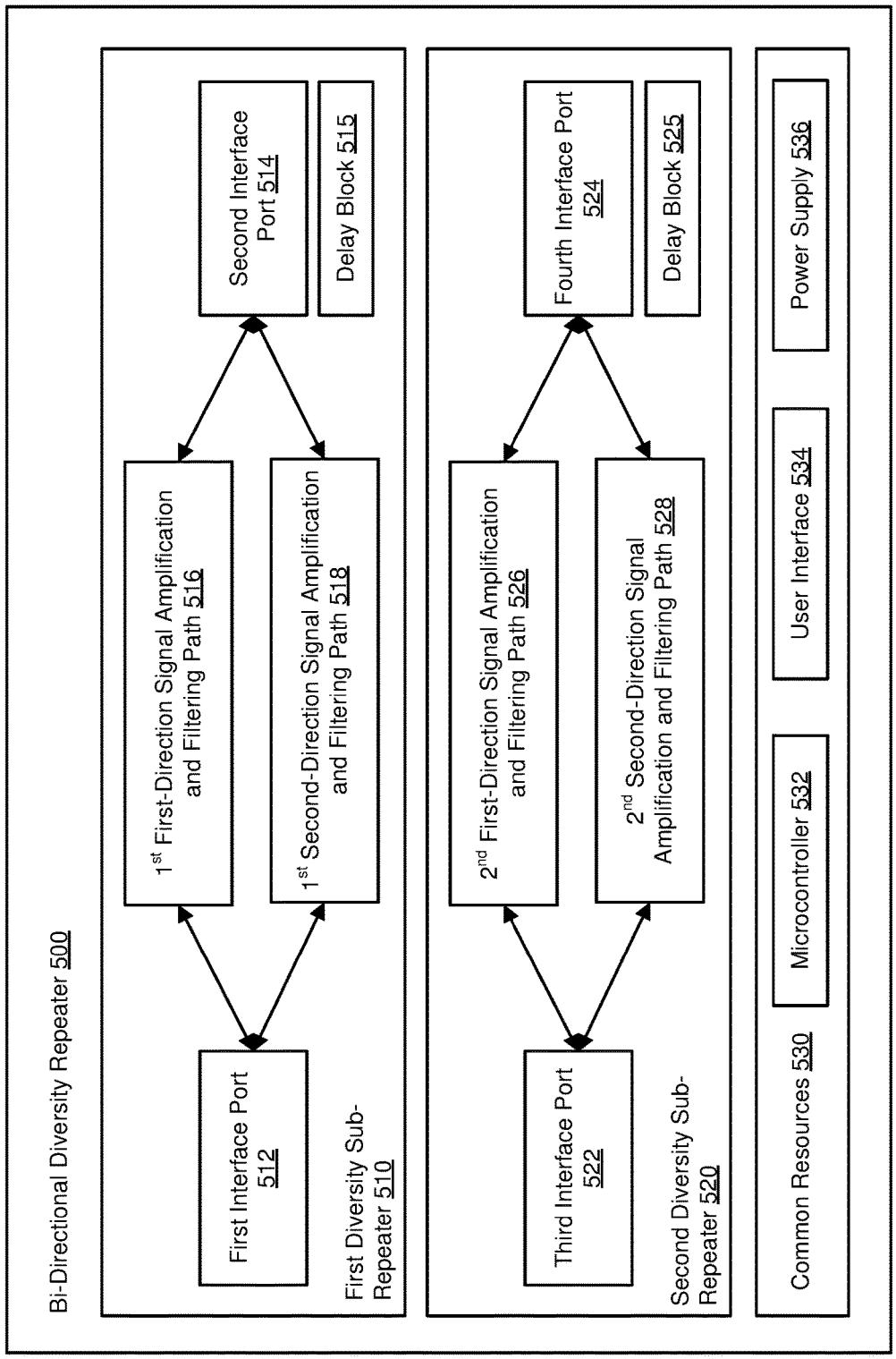
FIG. 5 illustrates functionality of a diversity bi-directional repeater in accordance with an example.

FIG. 5 illustrates functionality of a diversity bi-directional repeater 500. The diversity bi-directional repeater 500 can include a first diversity sub-repeater 510 and a second diversity sub-repeater 520. The first diversity sub-repeater 510 can include a first interface port 512, a second interface port 514, a 1st first-direction signal amplification and filtering path 516 communicatively coupled between the first interface port 512 and the second interface port 514, and a 1st second direction signal amplification and filtering path 518 communicatively coupled between the first interface port 512 and the second interface port 514. The second diversity sub-repeater 520 can include a third interface port 522, a fourth interface port 524, a 2nd first-direction signal amplification and filtering path 526 communicatively coupled between the third interface port 522 and the fourth interface port 524, and a 2nd second direction signal amplification and filtering path 528 communicatively coupled between the third interface port 522 and the fourth interface port 524. Further, the first diversity sub-repeater 510 can include a delay block 515 and the second diversity sub-repeater 520 can include a delay block 525. Further, the diversity bi-directional repeater 500 can include common resources 530 that are accessible to both the first diversity sub-repeater 510 and the second diversity sub-repeater 520, where the common resources 530 can include a common microcontroller 532, a common user interface 534, or a common power supply 536.

In one example, the $1^{st}$ first-direction signal amplification and filtering path 516 can be a $1^{st}$ uplink signal amplification and filtering path, the $1^{st}$ second direction signal amplification and filtering path 518 can be a $1^{st}$ downlink signal amplification and filtering path, the $2^{nd}$ first-direction signal amplification and filtering path 526 can be a $2^{nd}$ uplink signal amplification and filtering path, and the $2^{nd}$ second direction signal amplification and filtering path 528 can be a $2^{nd}$ downlink signal amplification and filtering path.

Figure 6:
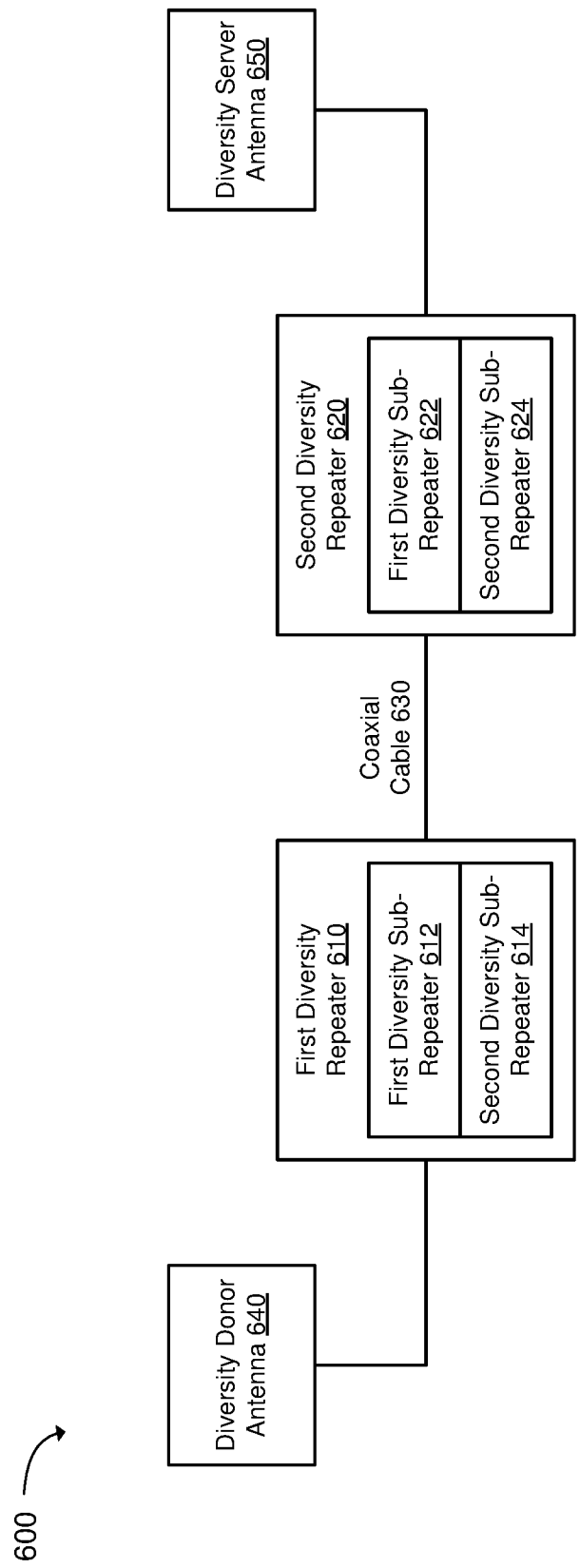
FIG. 6 illustrates an in-line repeater system in accordance with an example.

FIG. 6 illustrates an example of an in-line repeater system 600. The in-line repeater system 600 can include a first diversity repeater 610 and a second diversity repeater 620. The first diversity repeater 610 and the second diversity repeater 620 can be connected via a coaxial cable 630. The first diversity repeater 610 can include a first diversity sub-repeater 612 and a second diversity sub-repeater 614. Similarly, the second diversity repeater 620 can include a first diversity sub-repeater 622 and a second diversity sub-repeater 624. The first diversity repeater 610 can be communicatively coupled to a diversity donor antenna 640 and the second diversity repeater 620 can be communicatively coupled to a diversity server antenna 650. In other words, in the in-line repeater system 600, the first diversity repeater 610 can be physically positioned nearer to the diversity donor antenna 640, and the second diversity repeater 620 can be physically positioned nearer to the diversity server antenna 650. This configuration can function to mitigate coaxial cable loss between the first diversity repeater 610 and the second diversity repeater 620.

Figure 7:
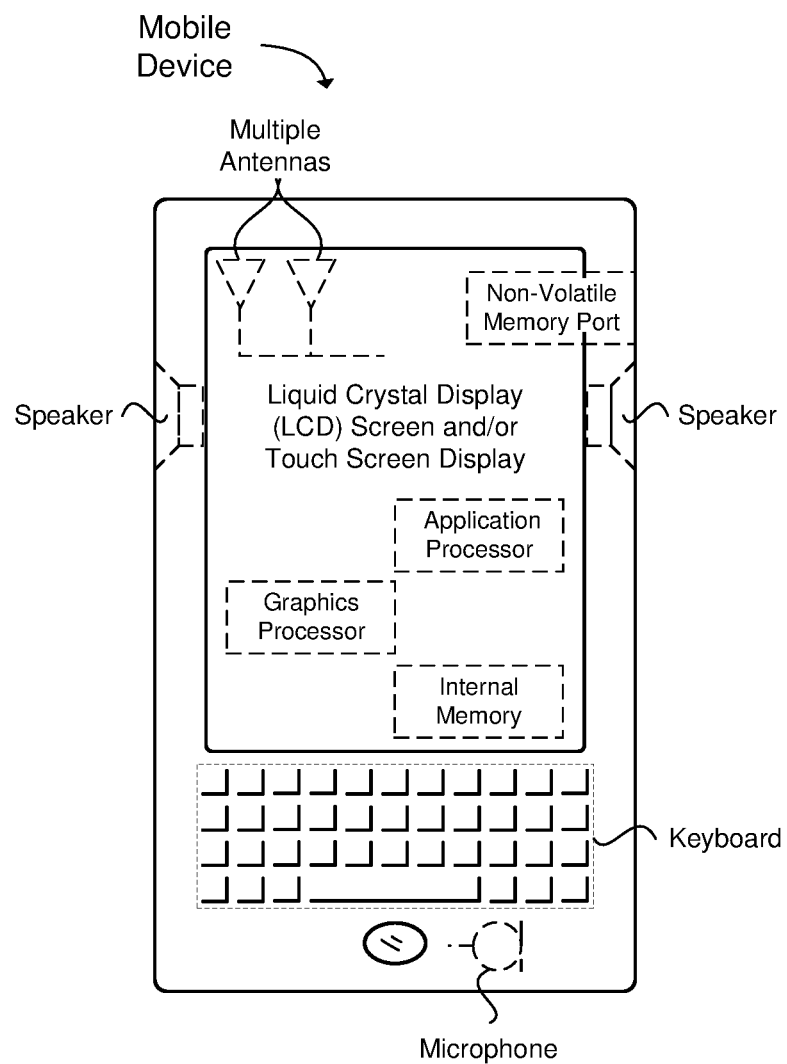
FIG. 7 illustrates a wireless device in accordance with an example.

FIG. 7 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a bi-directional diversity repeater, comprising at least: a first interface port; a second interface port; a 1st first-direction signal amplification and filtering path communicatively coupled between the first interface port and the second interface port; a 1st second direction signal amplification and filtering path communicatively coupled between the first interface port and the second interface port; a third interface port; a fourth interface port; a 2nd first-direction signal amplification and filtering path communicatively coupled between the third interface port and the fourth interface port; and a 2nd second direction signal amplification and filtering path communicatively coupled between the third interface port and the fourth interface port, wherein the $1^{st}$ first-direction signal amplification and filtering path and the $2^{nd}$ first-direction signal amplification and filtering path amplify same frequencies and the $1^{st}$ second direction signal amplification and filtering path and the $2^{nd}$ second direction signal amplification and filtering path amplify same frequencies.

Example 2 includes the bi-directional diversity repeater of Example 1, wherein: the first interface port and the third interface port are communicatively coupled to a diversity donor antenna; and the second interface port and the fourth interface port are communicatively coupled to a diversity server antenna.

Example 3 includes the bi-directional diversity repeater of any of Examples 1 to 2, further comprising at least: a first diversity sub-repeater that includes the first interface port and the second interface port; and a second diversity sub-repeater that includes the third interface port and the fourth interface port, wherein the first diversity sub-repeater is packaged with the second diversity sub-repeater in the bi-directional diversity repeater to achieve a multiple-input multiple-output (MIMO) capability for the bi-directional diversity repeater with improved signal diversity, bitrate and error rate.

Example 4 includes the bi-directional diversity repeater of any of Examples 1 to 3, wherein the first diversity sub-repeater includes a delay block to apply a defined signal delay, wherein the second diversity sub-repeater does not include a delay block, thereby producing a delay spread between the first diversity sub-repeater and the second diversity sub-repeater to improve the MIMO capability for the bi-directional diversity repeater in terms of one or more of: signal diversity, bitrate or error rate.

Example 5 includes the bi-directional diversity repeater of any of Examples 1 to 4, wherein the first diversity sub-repeater includes a delay block to apply a first signal delay and the second diversity sub-repeater includes a delay block to apply a second signal delay that is different than the first signal delay, thereby producing a delay spread between the first diversity sub-repeater and the second diversity sub-repeater to improve the MIMO capability for the bi-directional diversity repeater in terms of one or more of: signal diversity, bitrate or error rate.

Example 6 includes the bi-directional diversity repeater of any of Examples 1 to 5, wherein the first diversity sub-repeater includes a different coaxial cable length or a different level of filtering with respect to the second diversity sub-repeater, thereby producing a delay spread between the first diversity sub-repeater and the second diversity sub-repeater to improve the MIMO capability for the bi-directional diversity repeater in terms of one or more of: signal diversity, bitrate or error rate.

Example 7 includes the bi-directional diversity repeater of any of Examples 1 to 6, wherein the first diversity sub-repeater is operable to filter and amplify signals on a same set of bands as the second diversity sub-repeater to improve the MIMO capability for the bi-directional diversity repeater in terms of one or more of: signal diversity, bitrate or error rate.

Example 8 includes the bi-directional diversity repeater of any of Examples 1 to 7, wherein the first diversity sub-repeater is operable to share a network protection with the second diversity sub-repeater.

Example 9 includes the bi-directional diversity repeater of any of Examples 1 to 8, wherein the first diversity sub-repeater is operable to produce one or more of a gain, an output power or an automatic gain control (AGC) differential that is different from that produced by the second diversity sub-repeater.

Example 10 includes the bi-directional diversity repeater of any of Examples 1 to 9, wherein the bi-directional diversity repeater is included in an in-line repeater system in which the bi-directional diversity repeater is physically positioned nearer to a diversity donor antenna and a second bi-directional diversity repeater is physically positioned nearer to a diversity server antenna, thereby mitigating coaxial cable loss between the bi-directional diversity repeater and the second bi-directional diversity repeater.

Example 11 includes the bi-directional diversity repeater of any of Examples 1 to 10, further comprising one or more of: a common microcontroller; a common user interface; or a common power supply, wherein the common microcontroller, the common user interface and the common power supply are accessible to the first diversity sub-repeater and the second diversity sub-repeater.

Example 12 includes the bi-directional diversity repeater of any of Examples 1 to 11, wherein: the first interface and the third interface are communicatively coupled to the diversity donor antenna via a first set of parallel coaxial cables; and the second interface and the fourth interface are communicatively coupled to the diversity server antenna via a second set of parallel coaxial cables.

Example 13 includes the bi-directional diversity repeater of any of Examples 1 to 12, wherein: the diversity donor antenna includes two or more donor antennas that are in separate packages or in a same package; and the diversity server antenna includes two or more server antennas that are in separate packages or in a same package, wherein separate packages for the diversity donor antenna and the diversity server antenna, respectively, provide increased spatial diversity and isolation.

Example 14 includes the bi-directional diversity repeater of any of Examples 1 to 13, wherein the diversity server antenna includes multiple diversity server antennas which are communicatively coupled via a splitter or a tap in the bi-directional diversity repeater.

Example 15 includes the bi-directional diversity repeater of any of Examples 1 to 14, further comprising: a first common connector that enables the first interface port and the third interface port of the bi-directional diversity repeater to be communicatively coupled to the diversity donor antenna; and a second common connector that enables the second interface port and the fourth interface port of the bi-directional diversity repeater to be communicatively coupled to the diversity server antenna Example 16 includes the bi-directional diversity repeater of any of Examples 1 to 15, wherein: the 1st first-direction signal amplification and filtering path is a 1st uplink signal amplification and filtering path; the 1st second direction signal amplification and filtering path is a 1st downlink signal amplification and filtering path; the 2nd first-direction signal amplification and filtering path is a 2nd uplink signal amplification and filtering path; and the 2nd second direction signal amplification and filtering path is a 2nd downlink signal amplification and filtering path.

Example 17 includes the bi-directional diversity repeater of any of Examples 1 to 16, wherein the bi-directional diversity repeater is configured to operate in a bi-directional multiple-input multiple-output (MIMO) repeater system.

Example 18 includes the bi-directional diversity repeater of any of Examples 1 to 17, wherein the bi-directional diversity repeater is configured to provide system redundancy when communicating data between a base station and a mobile device.

Example 19 includes a bi-directional multiple-input multiple-output (MIMO) repeater system, comprising: a diversity donor antenna; a diversity server antenna; a diversity repeater communicatively coupled to the diversity donor antenna and the diversity server antenna, wherein the diversity repeater includes at least a first diversity sub-repeater and a second diversity sub-repeater that are packaged together to achieve a MIMO capability for the diversity repeater in the MIMO repeater system.

Example 20 includes the bi-directional MIMO repeater system of Example 19, wherein the first diversity sub-repeater includes: a first interface port; a second interface port; a 1st first-direction signal amplification and filtering path communicatively coupled between the first interface port and the second interface port; and a 1st second direction signal amplification and filtering path communicatively coupled between the first interface port and the second interface port.

Example 21 includes the bi-directional MIMO repeater system of any of Examples 19 to 20, wherein the second diversity sub-repeater includes: a third interface port; a fourth interface port; a 2nd first-direction signal amplification and filtering path communicatively coupled between the third interface port and the fourth interface port; and a 2nd second direction signal amplification and filtering path communicatively coupled between the third interface port and the fourth interface port.

Example 22 includes the bi-directional MIMO repeater system of any of Examples 19 to 21, wherein: the first diversity sub-repeater includes a delay block to apply a defined signal delay; and the second diversity sub-repeater does not include a delay block, thereby producing a delay spread between the first diversity sub-repeater and the second diversity sub-repeater to improve the MIMO capability for the diversity repeater in the MIMO repeater system in terms of one or more of: signal diversity, bitrate or error rate.

Example 23 includes the bi-directional MIMO repeater system of any of Examples 19 to 22, wherein: the first diversity sub-repeater includes a delay block to apply a first signal delay; and the second diversity sub-repeater includes a delay block to apply a second signal delay, thereby producing a delay spread between the first diversity sub-repeater and the second diversity sub-repeater to improve the MIMO capability for the diversity repeater in the MIMO repeater system in terms of one or more of: signal diversity, bitrate or error rate.

Example 24 includes the bi-directional MIMO repeater system of any of Examples 19 to 23, wherein the first diversity sub-repeater is operable to filter and amplify signals on a same set of bands as the second diversity sub-repeater to improve the MIMO capability for the diversity repeater in the MIMO repeater system in terms of one or more of: signal diversity, bitrate or error rate.

Example 25 includes the bi-directional MIMO repeater system of any of Examples 19 to 24, wherein the first diversity sub-repeater is operable to share a network protection with the second diversity sub-repeater.

Example 26 includes the bi-directional MIMO repeater system of any of Examples 19 to 25, wherein the first diversity sub-repeater is operable produce one or more of a gain, an output power or an automatic gain control (AGC) differential that is different from that produced by the second diversity sub-repeater.

Example 27 includes the bi-directional MIMO repeater system of any of Examples 19 to 26, wherein: the first diversity sub-repeater and the second diversity sub-repeater are communicatively coupled to the diversity donor antenna via a first parallel coaxial cable; and the first diversity sub-repeater and the second diversity sub-repeater are communicatively coupled to the diversity server antenna via a second parallel coaxial cable.

Example 28 includes the bi-directional MIMO repeater system of any of Examples 19 to 27, wherein: the first diversity sub-repeater and the second diversity sub-repeater are attached to the first parallel coaxial cable via a first common connector; and the first diversity sub-repeater and the second diversity sub-repeater are attached to the second parallel coaxial cable via a second common connector.

Example 29 includes the bi-directional MIMO repeater system of any of Examples 19 to 28, wherein the diversity repeater includes one or more of: a common microcontroller; a common user interface; or a common power supply, wherein the common microcontroller, the common user interface and the common power supply are accessible to the first diversity sub-repeater and the second diversity sub-repeater.

Example 30 includes the bi-directional MIMO repeater system of any of Examples 19 to 29, wherein the MIMO repeater system includes: the diversity donor antenna with N separate donor antennas in a single antenna package, the diversity server antenna with N separate server antennas in a single antenna package, and the diversity repeater that includes N diversity sub-repeaters, wherein N is an integer.

Example 31 includes a diversity repeater unit in a wireless multiple-input multiple-output (MIMO) repeater system, the diversity repeater unit comprising: a diversity antenna; a wireless transceiver; and a diversity repeater that is communicatively coupled to the diversity antenna and the wireless transceiver, wherein the diversity repeater includes two or more diversity sub-repeaters that are packaged together to achieve a MIMO capability for the diversity repeater unit in the wireless MIMO repeater system, wherein each of the two or more diversity sub-repeaters include one or more amplification and filtering signal paths for amplifying and filtering signals.

Example 32 includes the diversity repeater unit of Example 31, wherein the diversity repeater unit is one of a diversity donor unit or a diversity server unit.

Example 33 includes the diversity repeater unit of any of Examples 31 to 32, wherein the diversity antenna is one of a diversity donor antenna or a diversity server antenna.

Example 34 includes the diversity repeater unit of any of Examples 31 to 33, further comprising one or more of: a common microcontroller that is accessible to the diversity repeater; an application-specific integrated circuit (ASIC) that is accessible to the diversity repeater; a common user interface that is accessible to the diversity repeater; a common power supply that is accessible to the diversity repeater; or a common wireless antenna that is accessible to the diversity repeater.

Example 35 includes the diversity repeater unit of any of Examples 31 to 34, wherein the diversity repeater unit includes: the diversity antenna with N separate antennas in a single antenna package, and N diversity sub-repeaters in the diversity repeater, wherein N is an integer.

Example 36 includes the diversity repeater unit of any of Examples 31 to 35, wherein the two or more diversity sub-repeaters includes a first diversity sub-repeater and a second diversity sub-repeater, wherein the first diversity sub-repeater includes a delay block to apply a first signal delay, and the second diversity sub-repeater includes a delay block to apply a second signal delay, thereby producing a delay spread between the first diversity sub-repeater and the second diversity sub-repeater to improve the MIMO capability for the diversity repeater unit in the wireless MIMO repeater system in terms of one or more of: signal diversity, bitrate or error rate.

Example 37 includes the diversity repeater unit of any of Examples 31 to 36, wherein the two or more diversity sub-repeaters includes a first diversity sub-repeater and a second diversity sub-repeater, wherein the first diversity sub-repeater is operable to filter and amplify signals on a same set of bands as the second diversity sub-repeater to improve the MIMO capability for the diversity repeater unit in the wireless MIMO repeater system in terms of one or more of: signal diversity, bitrate or error rate.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A bi-directional diversity repeater, comprising at least:
a first interface port;
a second interface port;
a $1^{st}$ first-direction signal amplification and filtering path communicatively coupled between the first interface port and the second interface port;
a $1^{st}$ second direction signal amplification and filtering path communicatively coupled between the first interface port and the second interface port;
a third interface port;
a fourth interface port; and
a $2^{nd}$ second direction signal amplification and filtering path communicatively coupled between the third interface port and the fourth interface port,
wherein:
the $1^{st}$ second-direction signal amplification and filtering path and the $2^{nd}$ second-direction signal amplification and filtering path amplify a same second-direction frequency range;
the first interface port and the third interface port are communicatively coupled to a diversity donor antenna;
the second interface port and the fourth interface port are communicatively coupled to a diversity server antenna to achieve a multiple-input multiple-output (MIMO) capability for the bi-directional diversity repeater; and
at least one of:
the diversity donor antenna includes two or more donor antennas that are in separate packages; or
the diversity server antenna includes two or more server antennas that are in separate packages;
wherein separate packages for the diversity donor antenna and the diversity server antenna, respectively, provide increased spatial diversity and isolation.

2. The bi-directional diversity repeater of claim 1, further comprising at least:
a first diversity sub-repeater that includes the first interface port and the second interface port; and
a second diversity sub-repeater that includes the third interface port and the fourth interface port,
wherein the first diversity sub-repeater is packaged with the second diversity sub-repeater in the bi-directional diversity repeater to achieve a multiple-input multiple-output (MIMO) capability for the bi-directional diversity repeater with improved signal diversity, bitrate and error rate.

3. The bi-directional diversity repeater of claim 2, wherein the first diversity sub-repeater includes a delay block to apply a defined signal delay, wherein the second diversity sub-repeater does not include a delay block, thereby producing a delay spread between the first diversity sub-repeater and the second diversity sub-repeater to improve the MIMO capability for the bi-directional diversity repeater in terms of one or more of: signal diversity, bitrate or error rate.

4. The bi-directional diversity repeater of claim 2, wherein the first diversity sub-repeater includes a delay block to apply a first signal delay and the second diversity sub-repeater includes a delay block to apply a second signal delay that is different than the first signal delay, thereby producing a delay spread between the first diversity sub-repeater and the second diversity sub-repeater to improve the MIMO capability for the bi-directional diversity repeater in terms of one or more of: signal diversity, bitrate or error rate.

5. The bi-directional diversity repeater of claim 2, wherein the first diversity sub-repeater includes a different coaxial cable length or a different level of filtering with respect to the second diversity sub-repeater, thereby producing a delay spread between the first diversity sub-repeater and the second diversity sub-repeater to improve the MIMO capability for the bi-directional diversity repeater in terms of one or more of: signal diversity, bitrate or error rate.

6. The bi-directional diversity repeater of claim 2, wherein the first diversity sub-repeater is operable to filter and amplify signals on a same set of bands as the second diversity sub-repeater to improve the MIMO capability for the bi-directional diversity repeater in terms of one or more of: signal diversity, bitrate or error rate.

7. The bi-directional diversity repeater of claim 2, wherein the first diversity sub-repeater is operable to share a network protection with the second diversity sub-repeater.

8. The bi-directional diversity repeater of claim 2, wherein the first diversity sub-repeater is operable to produce one or more of a gain, an output power or an automatic gain control (AGC) differential that is different from that produced by the second diversity sub-repeater.

9. The bi-directional diversity repeater of claim 2, wherein the bi-directional diversity repeater is included in an in-line repeater system in which the bi-directional diversity repeater is physically positioned nearer to a diversity donor antenna and a second bi-directional diversity repeater is physically positioned nearer to a diversity server antenna, thereby mitigating coaxial cable loss between the bi-directional diversity repeater and the second bi-directional diversity repeater.

10. The bi-directional diversity repeater of claim 2, further comprising one or more of:
a common microcontroller;
a common user interface; or
a common power supply,
wherein the common microcontroller, the common user interface and the common power supply are accessible to the first diversity sub-repeater and the second diversity sub-repeater.

11. The bi-directional diversity repeater of claim 1, wherein:
the first interface and the third interface are communicatively coupled to the diversity donor antenna via a first set of parallel coaxial cables; and
the second interface and the fourth interface are communicatively coupled to the diversity server antenna via a second set of parallel coaxial cables.

12. The bi-directional diversity repeater of claim 1, wherein the diversity server antenna includes multiple diversity server antennas which are communicatively coupled via a splitter or a tap in the bi-directional diversity repeater.

13. The bi-directional diversity repeater of claim 1, wherein:
the $1^{st}$ first-direction signal amplification and filtering path is a $1^{st}$ uplink signal amplification and filtering path;
the $1^{st}$ second direction signal amplification and filtering path is a $1^{st}$ downlink signal amplification and filtering path; and
the $2^{nd}$ second direction signal amplification and filtering path is a $2^{nd}$ downlink signal amplification and filtering path.

14. The bi-directional diversity repeater of claim 1, wherein the bi-directional diversity repeater is configured to operate in a bi-directional multiple-input multiple-output (MIMO) repeater system.

15. The bi-directional diversity repeater of claim 1, wherein the bi-directional diversity repeater is configured to provide system redundancy when communicating data between a base station and a mobile device.

16. The bi-directional diversity repeater of claim 1, wherein the diversity donor antenna includes:
an omni-directional antenna and a directional antenna; or
two or more omni-directional antennas; or
two or more directional antennas.

17. The bi-directional diversity repeater of claim 16, wherein the diversity donor antenna having:
the omni-directional antenna and the directional antenna is further configured to communicate with a first set of base stations using the omni-directional antenna and a second set of base stations using the directional antenna; or
two or more directional antennas is further configured to communicate with a first set of base stations using one of the two or more directional antennas and a second set of base stations using a second directional antenna of the two or more directional antennas.

18. The bi-directional diversity repeater of claim 1, further comprising:
a $2^{nd}$ first-direction signal amplification and filtering path communicatively coupled between the third interface port and the fourth interface port;
wherein the $1^{st}$ first-direction signal amplification and filtering path and the $2^{nd}$ first-direction signal amplification and filtering path amplify a same first-direction frequency range.

* * * * *